US006052740A

United States Patent [19]

Frederick

[11] Patent Number: 6,052,740

[45] Date of Patent: Apr. 18, 2000

[54] SYSTEM FOR MULTI-MODAL DISPLAY FUNCTIONALITY RESPONSIVE TO A CONVERGENCE FUNCTIONALITY MODULE TO SELECT BETWEEN COMPUTER FUNCTIONALITY MODE AND NON-COMPUTER FUNCTIONALITY MODE

[75] Inventor: John W. Frederick, Spring, Tex.

[73] Assignee: Compaq Computer Corporation, Houston, Tex.

[21] Appl. No.: 08/828,594

[22] Filed: Mar. 31, 1997

[51] Int. Cl.[7] .............................. G06F 13/00; G06F 13/14

[52] U.S. Cl. .................................. 710/8; 710/14; 348/554

[58] Field of Search ..................................... 395/821, 834, 395/828; 348/554; 710/1, 8, 14

[56] References Cited

U.S. PATENT DOCUMENTS

| | | | |
|---|---|---|---|
| 4,628,541 | 12/1986 | Beavers | 455/603 |
| 4,775,928 | 10/1988 | Kendall et al. | 364/300 |
| 4,970,549 | 11/1990 | Yoshizuka et al. | 355/209 |
| 5,136,398 | 8/1992 | Rodriguez-Cavazos et al. | 358/242 |
| 5,258,830 | 11/1993 | Schmidt et al. | 358/60 |
| 5,272,421 | 12/1993 | Kimura et al. | 315/368.12 |
| 5,448,697 | 9/1995 | Parks et al. | 395/162 |
| 5,499,040 | 3/1996 | McLaughlin et al. | 345/146 |
| 5,537,528 | 7/1996 | Takahashi et al. | 395/154 |
| 5,546,520 | 8/1996 | Cline et al. | 395/155 |
| 5,610,663 | 3/1997 | Nan et al. | 348/554 |
| 5,627,605 | 5/1997 | Kim | 348/745 |

OTHER PUBLICATIONS

"Display Data Channel (DDC™)Standard" *VESA*; 1996 Video Electronics Standards Association; DDC ver.2, rev. 1 (Jul. 24, 1996); pp. 1–36.

"Gateway 2000 Sells Destination Big Screen PC Through Retail Chains"; Internet article; Aug. 20, 1996; pp. 1–4.

"Gateway 2000 Launches Destination Big Screen PC Featuring 31–inch Monitor"; Internet article; Mar. 21, 1996; pp. 1–5.

"The Big–Tube PCTV"; PC Online/Trends Online; May 28, 1996; pp. 1–3.

"Destination Features"; Internet article; Aug. 21, 1996; pp. 1–5.

"Telefuzion"; Internet article; Mar. 12; pp. 1–2.

"High–Tech; Now you can tune your TV to the Internet"; Mike Snider; USA Today; Sep. 18, 1996; pp. 1–2.

Advanced Power Management (APM); BIOS Interface Specification; Intel Corporation/Microsoft Corporation; Revision 1.1, Sep. 1993; pp. (i–v) and 1–59.

*Primary Examiner*—Thomas C. Lee
*Assistant Examiner*—Rehana Perveen
*Attorney, Agent, or Firm*—Jenkins & Gilchrist a Professional Corporation

[57] ABSTRACT

A convergence device system comprising a display monitor subsystem, a computer subsystem coupled to the display monitor subsystem, and a convergence functionality module adapted to provide a video signal to the computer subsystem. The display monitor subsystem is selectably operable in one of a first functional mode and a second functional mode, responsive to a control signal generated by the computer subsystem, wherein each of the modes corresponds to a set of selected display settings for the display monitor subsystem.

25 Claims, 2 Drawing Sheets

SYSTEM FOR MULTI-MODAL DISPLAY FUNCTIONALITY RESPONSIVE TO A CONVERGENCE FUNCTIONALITY MODULE TO SELECT BETWEEN COMPUTER FUNCTIONALITY MODE AND NON-COMPUTER FUNCTIONALITY MODE

BACKGROUND OF THE INVENTION

1. Technical Field of the Invention

The present invention relates to display systems, and, in particular, to a display system especially well suited for operation in a convergence device system.

2. Description of Related Art

Achieving convergence of various information, entertainment and communications technologies has become a much sought-after goal. A highly visible example of this trend is the attempt to integrate computer technologies (such as, for example, personal computer technologies) with consumer/home electronics technologies (such as, for example, television technologies, video game technologies, video telephony, video disc technologies et cetera). It is hoped that one of the products of this convergence would be a single integrated device for information, entertainment and communications, which device can, at least in part, utilize the available communications bandwidth, mass storage and graphics handling capabilities of the personal computer (PC) to deliver, store and display a variety of applications so as to provide a seamlessly unified audio-visual environment to consumers.

In spite of many recent advances in this area, several problems persist. One of the more nettlesome difficulties relates to the presentation of quality 15 video on the display monitor associated with a PC, wherein the video signals are provided by a consumer/home electronics unit such as, for example, a receiver for TV signals, a video game unit, a video disc unit, and the like. It is known that PC display monitors, typically driven by the PC video signals (comprising three color signals—red, blue and green, and two sync signals—vertical and horizontal), often are not capable of displaying such high quality images as are expected from a consumer/home electronics unit when presented with video signals therefrom. In such situations, the displayed picture is usually of poor quality, beset with dullness and low contrast, among other problems. Part of the problem stems from the fact that PC display monitors are provided in general with display settings (such as contrast, brightness, color temperature, scanning width et cetera) that are different from the settings typically provided for monitors driven by composite video signals (e.g., TV signals). Some of the known technologies such as TV tuner cards plugged into a PC for processing incoming composite video signals do not offer a satisfactory solution insofar as the overall quality of the displayed images is concerned because, in part, these techniques do not provide for variable and selectable settings for display monitors.

Accordingly, based upon the foregoing, it should be understood and appreciated that there is a need for a display system, especially in a convergence-type device, that is capable of displaying both PC video signals as well as video signals from other sources with which a PC may be integrated. That is, it would be advantageous and desirable to provide a display system that is operable in multiple functional/display modes with selectable settings, depending upon the selection of the video sources. Although various display systems have been extant for sometime, no such system is known to have all of the advantages and novel features of the system described and claimed hereinbelow.

SUMMARY OF THE INVENTION

The present invention overcomes the above-identified problems as well as other shortcomings and deficiencies of existing technologies by providing a convergence device system that comprises a computer subsystem adapted to receive a signal from a convergence functionality module; and a display monitor subsystem coupled to the computer subsystem, wherein the display monitor subsystem is selectably operable in one of a first functional mode and a second functional mode. In accordance with the teachings of the present invention, an exemplary embodiment of the display monitor subsystem comprises a display monitor, a contrast setting element, a brightness setting element, an RGB amplifier, a velocity scan modulator and a color temperature setting element, wherein each of the contrast, brightness and color temperature setting elements, the velocity scan modulator and the RGB amplifier is adjustable in response at least in part to a control signal provided by the computer subsystem.

In another aspect, the present invention is drawn to a computer system that comprises a first subsystem including a monitor; a second subsystem adapted to receive a signal from a convergence functionality module, the second subsystem being coupled to the first subsystem, wherein the first subsystem is selectably operable in one of a first functional mode and a second functional mode.

In a yet another aspect, the present invention relates to a method of managing a multi-mode display subsystem in a convergence device system including a computer subsystem and a convergence functionality module that provides a selectable signal to the computer subsystem, the method comprising the steps of: generating a control signal, responsive to whether the selectable signal from the convergence functionality module is selected; and effectuating one of a first functional mode and a second functional mode, each of the modes being associated with the display subsystem, the effectuating step being performed in response at least in part to the control signal.

BRIEF DESCRIPTION OF THE DRAWINGS

A more complete understanding of the present invention may be had by reference to the following Detailed Description when taken in conjunction with the accompanying Drawings wherein.

DETAILED DESCRIPTION OF THE DRAWINGS

Figure 1:
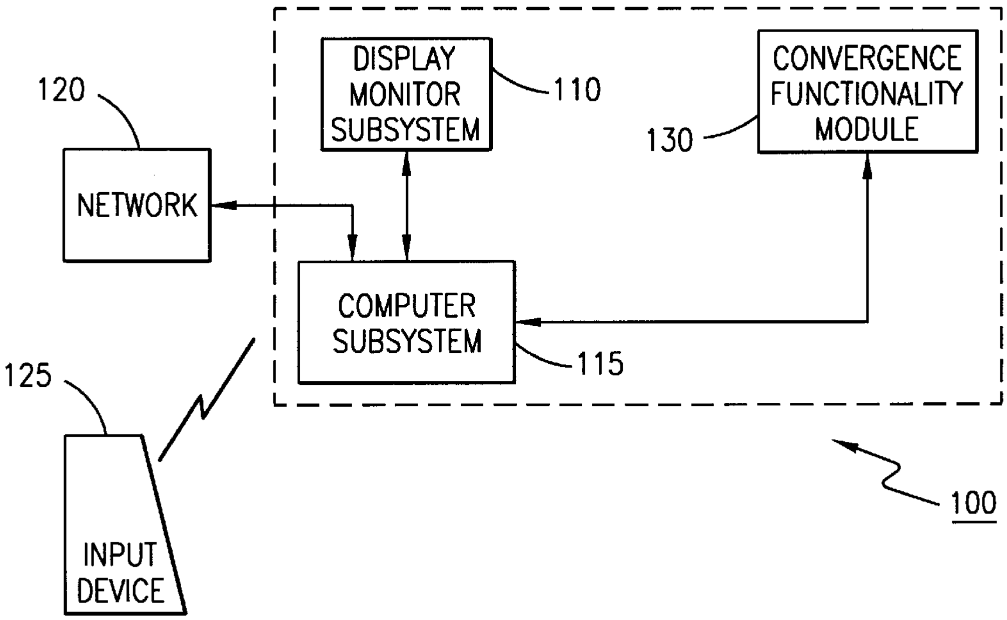
FIG. 1 illustrates a convergence device system in accordance with the teachings of the present invention.

Referring now to the Drawings wherein like or similar elements are designated with identical reference numerals throughout the several views, and wherein the various elements depicted are not necessarily drawn to scale, and, in particular, to FIG. 1, there is shown a block diagram of a convergence device system 100 utilizing the teachings of the present invention. The purpose of this block diagram is to illustrate the features of the present invention and the basic principles of operation of an exemplary embodiment thereof. This block diagram is not necessarily intended to schematically represent specific modules of hardware or any particular data or control paths therebetween.

The convergence device system 100 includes a first subsystem, display monitor subsystem 110, operable to receive and display thereon display signals received from a second subsystem, computer subsystem 115. Although not depicted, the subsystem 115 comprises a processor unit coupled to a storage unit, and may further preferably contain a communication port for enabling communication between the convergence device system 100 and a network 120.

Continuing to refer to FIG. 1, the network 120 can be understood to be any network, for example, a Local Area Network, a Metropolitan Area Network, a Wide Area Network, or the Internet. The computer subsystem 115 is connected to a convergence functionality module 130 that is adapted to receive and/or provide various combinations of composite and/or RF and/or video and/or audio and/or graphics and/or data signals. For example, the module 130 may comprise a receiver for receiving TV signals in any form, such as the National Television Standards Committee (NTSC) form or the Phase Alternate Line (PAL) form, via any medium, digital or analog, such as the cable system, the Digital Satellite System, or a network broadcast medium. In another embodiment, the module 130 may comprise a consumer/home electronics unit adapted to be integrated with the computer subsystem 115. For example, a video gaming unit or a video disc unit may be provided such that the outputs (video, audio, or both) of the units are controlled or modulated by the computer subsystem 115. A video controller service in the subsystem 115 may be responsible for managing these outputs such that appropriately modulated (or decoded or processed) display signals are selected to be forwarded to drive suitable output devices, for example, the display monitor subsystem 110 or an audio output device (not shown).

Although the module 130 and the subsystem 115 are shown to be two separate yet interconnected entities, the module 130 may in some embodiments of the present invention be integrated into the subsystem 115. Such an integrated subsystem may comprise in a single housing one or more video sources (or consumer/home electronics units including receivers for TV signals, gaming units, video telephony units etc.), the video control service for managing and selecting among these sources and for generating appropriate display signals to be provided to suitable output devices, and the processor and storage units.

Still continuing to refer to FIG. 1, the convergence device system 100 may be operable with an input device 125 which may comprise any of the following: remote control units, remote track-ball/mouse devices, remote pointing devices, wireless or wired keyboards, keyboards integrated with pointing devices, track-balls, and the like. Further, although not shown in this FIG., it should also be understood that the convergence device system 100 may contain such hardware modules as a power unit for supplying power thereto, TV tuner boards, CD-ROM players, floppy drives, printer ports, et cetera.

Figure 2:
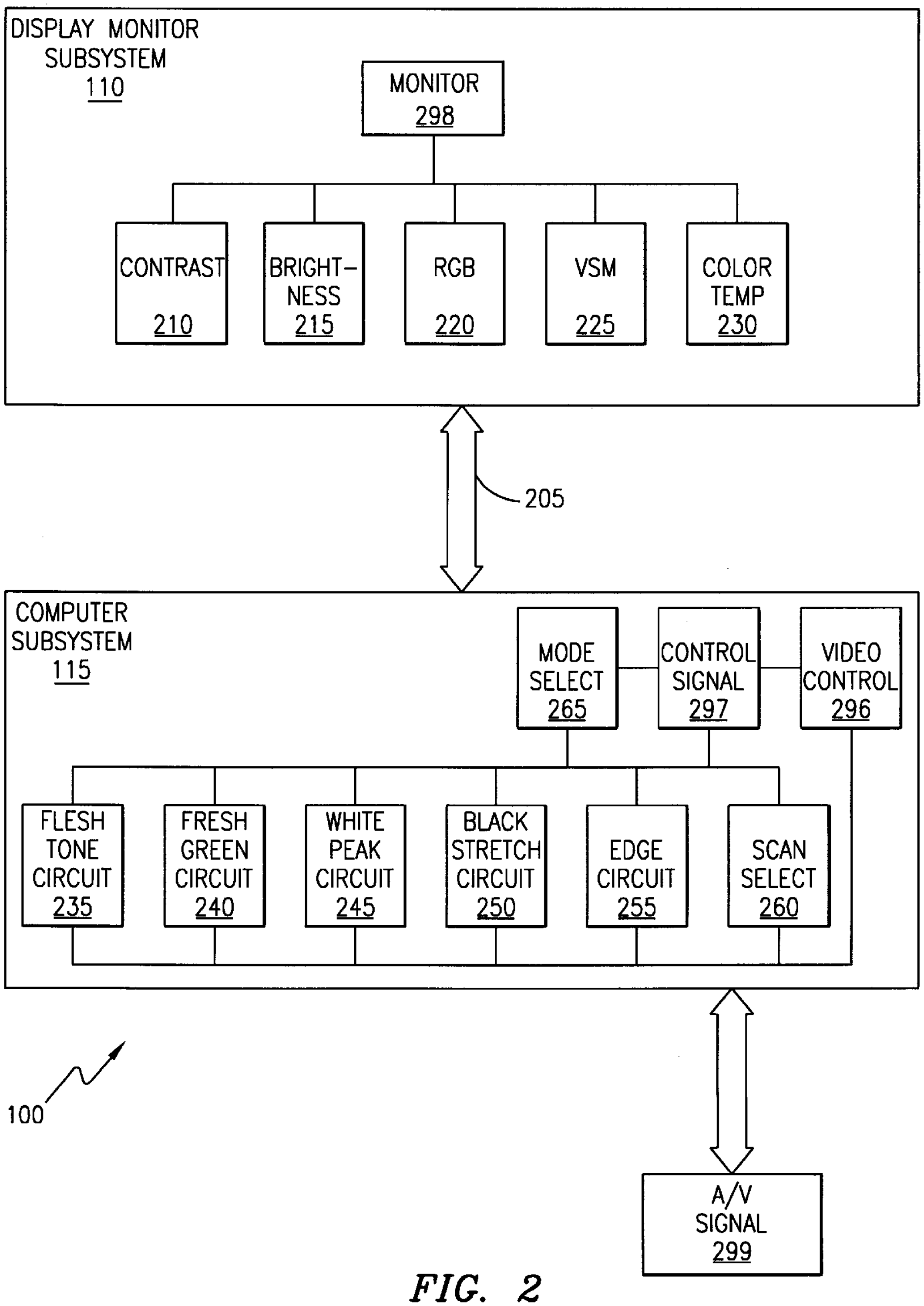
FIG. 2 depicts an exemplary display system in greater detail, which display system is included in a presently preferred convergence device system in accordance with the teachings of the present invention.

Referring now to FIG. 2, exemplary embodiments of the display monitor subsystem 110 and the computer subsystem 115 of the convergence device system 100 are shown in greater detail in accordance with the teachings of the present invention. A signal 299 may be selectably provided by the convergence functionality module 130 (shown in FIG. 1) to the subsystem 115 for appropriate processing. It should be understood that the signal 299 may be an audio, video, data, composite, or RF-based signal, or any combination thereof. Within computer subsystem 115 is a video control service 296, which is provided with the capability of managing, selecting and controlling the signal inputs. Service 296 may preferably generate a control signal 297 based upon whether signal 299 from the module 130 is selected or not. As can be appreciated, if no signals from the module 130 are selected, an appropriate control signal 297 may also be produced to indicate that condition. As will be discussed hereinbelow, the control signal 297 may be used at least in part for effectuating a selection between at least a first functional mode and a second functional mode associated with the display monitor subsystem 110, wherein each functional mode relates to a collection of visual and geometric characteristics of the images displayed on a monitor 298.

Continuing to refer to FIG. 2, the display monitor subsystem 110 preferably comprises a contrast setting element 210, a brightness setting element 215, a Red-Green-Blue (RGB) amplifier 220, a velocity scan modulator (VSM) 225 and a color temperature setting element 230. Preferably, each of the foregoing structures (which may be implemented as hardware, software, or firmware entities) is selectably and independently adjustable, responsive, at least in part, to the selection of a functional mode. It should be understood that this selection may be, at least in part, manual or automatic.

Still continuing to refer to FIG. 2, increasing a value associated with the contrast setting element 210 preferably increases the ratio between the maximum and minimum luminance associated with the image displayed on the monitor 298. Similarly, increasing a value associated with the brightness setting element 215 preferably increases display luminance. The RGB amplifier 220 provides a gain preferably in the appropriate spectral range so as to increase color saturation on the display monitor 298. Those skilled in the art may appreciate that the spectral gain may be substantially uniform across the color bands or may be color-dependent.

In a presently preferred embodiment of the monitor 298, an electron beam scans 480 lines per frame with a display rate of 60 frames per second. The velocity scan modulator 225 is preferably provided in the display monitor subsystem 110 so as to enhance the overall perceived picture quality of the monitor 298 adapted to display preferably non-interlaced frames. The general operation of the VSM 225 may be described as follows. An image to be displayed on the monitor 298 typically comprises at least in part a plurality of dark areas and white areas interspersed together. In a presently preferred embodiment, as the electron beam scans across the lines comprising the frame, it is made to increase its scanning speed within a dark area and decrease its scanning speed within a white area. Consequently, the dark areas (or bands) appear to be broader while the white areas appear to be thinner, giving rise to an enhancement in the overall picture quality.

Still further continuing to refer to FIG. 2, the color temperature setting element 230 is preferably provided in the display monitor subsystem 110 to additionally increase the picture quality associated with the monitor 298. In a preferred embodiment, the color temperature setting element 230 can be set to vary the color temperature from about 6,500° Kelvin to about 11,000° Kelvin, depending upon the selection of between the two functional modes.

A connecting element, for example, an interfacing bus 205 is disposed between the display monitor subsystem 110 and the computer subsystem 115 for conducting electrical signals (including at least in part the display signals) therebetween. In accordance with the teachings of the present invention, the bus 205 may comprise an Inter Integrated Circuit ($I^2C$) bus or a Universal Serial Bus (USB).

Further, within the ambit of the present invention, an exemplary embodiment of the convergence device system 100 may comprise additional elements as will be described immediately below, although the exact placement thereof is not critical. Accordingly, the following elements may be disposed in any combination either in the computer subsystem 115, in the display monitor subsystem 110, or as separate entities in the convergence device system 100 or in the input device 125 (shown in FIG.1) associated therewith.

In the embodiment depicted in FIG. 2, the computer subsystem 115 may comprise a flesh-tone correction circuit 235 for adjusting the reds in the spectrum comprising human complexions, a fresh green circuit 240 for adjusting the greens in the display of verdant imagery, a white peaking circuit 245 for increasing the brilliance of "white" colors, a black stretch circuit 250 for boosting the strength of "black" colors, and an edge enhancement circuit 255 for reducing or eliminating undesirable characteristics (such as noise, loss of strength, geometry-dependent distortion and the like) associated with either horizontal and/or vertical edges of a displayed frame. A scan selector 260 may also be provided in the computer subsystem 115 for selecting between an underscan and an overscan (by approximately 10%) of the displayed frame on the monitor 298. Additionally, a mode selector 265, that may be controlled at least in part by the control signal 297, may be provided for selecting a functional mode.

Based upon the foregoing, it should be appreciated that the convergence device system 100 provided in accordance with the teachings of the present invention includes a display monitor subsystem 110 with multiple functional modalities depending in part upon which of the aforementioned features are selectively enabled or adjusted. For example, in a first functional mode (that is, a "computer" mode), preferably no video signal 299 from the convergence functionality module 130 may be selected by the video control service 296 and an appropriate control signal 297 may be accordingly generated. That is, in this mode the display signals typically comprise at least in part computer video signals (Video Graphic Array signals and the like) generated by the computer subsystem 115. Based at least in part upon the control signal 297, the scan selector 260 may preferably select an underscan setting for the display monitor 298 and a selected combination of the features described hereinabove may be disabled in conjunction with an appropriate mode selection effectuated by the mode selector 265. In the exemplary computer mode, the velocity scan modulator 225 is disabled and each of the RGB amplifier 220, the contrast setting element 210 and the brightness setting element 215 is adjusted to a predetermined "low" or "decreased" values. Further, in the exemplary computer mode, the color temperature setting element 230 may be adjusted to a setting of around 9,300° Kelvin. On the other hand, in a second functional mode (that is, a "non-computer" mode or an "enhanced" mode), the aforesaid features may be selectively enabled or increased when a signal 299 provided by the convergence functionality module 130 is selected by the video control service 296. For example, in a presently preferred embodiment of the non-computer mode, the VSM 225 is enabled, color saturation is increased by appropriately changing the gain of the RGB amplifier 220, and the brightness setting and contrast setting elements (elements 215 and 210, respectively) are set to increased values. Further, the scan selector 260 may select an overscan setting for the monitor 298 in this mode. As can be understood, an appropriate control signal 297 may be generated in this mode in conjunction with suitable selection by the mode selector 265.

Although only certain embodiments of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims. For example, it should be understood that each of the features (such as the mode selector, scan selector, RGB amplifier, velocity scan modulator, the various setting elements, et cetera) described above may be located in different parts of the convergence device system 100, including the input device 125 associated therewith. Moreover, both the subsystems (subsystem 110 and subsystem 115) may be unified with the convergence functionality module 130 to give rise to a highly integrated device in a single housing. Accordingly, it should be appreciated that these and other rearrangements and modifications are within the scope of the present invention as defined by the claims set forth hereinbelow.

What is claimed is:

1. A convergence device comprising:

a computer subsystem adapted to receive a signal from a convergence functionality module; and a display monitor subsystem coupled to said computer subsystem, said display monitor subsystem selectably operable in one of a computer functionality mode and a non-computer functionality mode; and a mode selector coupled to said display monitor subsystem, said mode selector responsive to said signal from said convergence functionality module to signal said display monitor subsystem to operate in a particular one of said computer functionality mode and said non-computer functionality mode.

2. The system as recited in claim 1, wherein said display monitor subsystem comprises a display monitor, a contrast setting element, a brightness setting element, an RGB amplifier, a velocity scan modulator and a color temperature setting element, wherein each of said contrast setting element, said brightness setting element, said RGB amplifier, said velocity scan modulator and said color temperature setting element is adjustable in response at least in part to a control signal provided by said computer subsystem.

3. The system as recited in claim 1, further comprising a flesh-tone circuit, a fresh green circuit, a white peaking circuit, a black stretch circuit, an edge enhancement circuit and a scan selector, wherein each of said flesh-tone circuit, said fresh green circuit, said white peaking circuit, said black stretch circuit, said edge enhancement circuit and said scan selector is adjustable in response at least in part to a control signal provided by said computer subsystem.

4. The system as recited in claim 1, wherein said computer subsystem and said display monitor subsystem are coupled together via an Inter Integrated Circuit ($I^2C$) bus.

5. The system as recited in claim 1, wherein said convergence functionality module comprises a video gaming unit adapted to be operable with said computer subsystem.

6. The system as recited in claim 1, wherein said convergence functionality module comprises a video disc unit adapted to be operable with said computer subsystem.

7. The system as recited in claim 1, wherein said convergence functionality module comprises a consumer electronics unit adapted to be operable with said computer subsystem.

8. The system as recited in claim 1, wherein said convergence functionality module comprises a video telephony unit adapted to be operable with said computer subsystem.

9. A computer system comprising:

a first subsystem including a monitor, said monitor including an adjustable velocity scan modulator; and a second subsystem adapted to receive a signal from a convergence functionality module, said second subsystem being coupled to said first subsystem;

wherein said first subsystem is selectably operable in one of a first functional mode and a second functional mode.

10. The system as recited in claim 9, wherein said first subsystem comprises a contrast setting element, a brightness setting element, an RGB amplifier, and a color temperature setting element, wherein each of said contrast setting element, said brightness setting element, said RGB amplifier, and said color temperature setting element is adjustable in response at least in part to a control signal provided by said second subsystem.

11. The system as recited in claim 9, further comprising a flesh-tone circuit, a fresh green circuit, a white peaking circuit, a black stretch circuit, an edge enhancement circuit and a scan selector, wherein each of said flesh-tone circuit, said fresh green circuit, said white peaking circuit, said black stretch circuit, said edge enhancement circuit and said scan selector is adjustable in response at least in part to a control signal provided by said second subsystem.

12. The system as recited in claim 9, wherein said computer subsystem and said display monitor subsystem are coupled together via a Universal Serial Bus (USB).

13. The system as recited in claim 9, wherein said convergence functionality module comprises a video gaming unit adapted to be operable with said second subsystem.

14. The system as recited in claim 9, wherein said convergence functionality module comprises a video disc unit adapted to be operable with said second subsystem.

15. The system as recited in claim 9, wherein said convergence functionality module comprises a consumer electronics unit adapted to be operable with said second subsystem.

16. The system as recited in claim 9, wherein said convergence functionality module comprises a video telephony unit adapted to be operable with said second subsystem.

17. A method for managing a multi-modal display subsystem in a convergence device system including a computer subsystem and a convergence functionality module that provides a selectable signal to said computer subsystem, which display subsystem is coupled to said computer subsystem, said method comprising the steps of:

generating a control signal, responsive to whether said selectable signal from said convergence functionality module is selected; and effectuating one of a first functional mode and a second functional mode, each of said functional modes being associated with said display subsystem, said effectuating step computer initiated responsive at least in part to said control signal.

18. The method as recited in claim 17, wherein said step of effectuating said first functional mode comprises the steps of:

setting an underscan level in a scan selector;

disabling a velocity scan modulator;

adjusting a value associated with a contrast element, a brightness element and a color temperature element to a predetermined low level; and decreasing a gain parameter associated with an RGB amplifier to a predetermined low level;

wherein said scan selector, said velocity modulator, said contrast element, said brightness element, said color temperature element and said RGB amplifier are each associated with said display subsystem.

19. The method as recited in claim 17, wherein said step of effectuating said second functional mode comprises the steps of:

setting an overscan level in a scan selector;

enabling a velocity scan modulator;

adjusting a value associated with a contrast element, a brightness element and a color temperature element to a predetermined high level; and increasing a gain parameter associated with an RGB amplifier to a predetermined high level;

wherein said scan selector, said velocity modulator, said contrast element, said brightness element, said color temperature element and said RGB amplifier are each associated with said display subsystem.

20. The convergence system of claim 1 wherein said display monitor subsystem is operable in an overscan mode and an underscan mode and wherein said display monitor subsystem is operable in said overscan mode when said display monitor subsystem is operable in said non-computer functionality mode and said display monitor subsystem is operable in said underscan mode when said display monitor subsystem is operable in said computer functionality mode.

21. The convergence system of claim 1 further comprising:

a velocity scan modulator connected to said display monitor subsystem;

wherein said velocity scan modulator is disabled when said display monitor subsystem is operable in said computer functionality mode.

22. The computer system of claim 9 wherein said velocity scan modulator is enabled when said monitor is operable in said first functional mode and further wherein said velocity scan modulator is disabled when said monitor is operable in said second functional mode.

23. The computer system of claim 9 wherein said monitor is operable in an overscan mode and an underscan mode, said monitor operable in said overscan mode when said first subsystem is operable in said first functional mode and said monitor operable in said underscan mode when said first subsystem is operable in said second functional mode.

24. A convergence device system comprising:

a processor means adapted to receive a signal from a convergence functionality means; and a display means coupled to said processor means, said display means selectably operable in one of a computer functionality mode and a non-computer functionality mode; and a mode selector means coupled to said display means, said mode selector means responsive to said signal from said convergence functionality means to signal said display means to operate in a particular one of said computer functionality mode and said non-computer functionality mode.

25. The convergence system of claim 24 further comprising:

a velocity scan modulator means;

wherein said velocity scan modulator means is disabled when said display means is operable in said computer functionality mode.

* * * * *